US009535889B2

(12) United States Patent
De Jager et al.

(10) Patent No.: US 9,535,889 B2
(45) Date of Patent: Jan. 3, 2017

(54) METHOD TO DETERMINE WHETHER ADVERTISEMENTS IN A WEB PAGE ARE IN VIEW

(71) Applicant: Google Inc., Mountain View, CA (US)

(72) Inventors: Douglas De Jager, London (GB); Ben Hodgson, Kingston Upon Thames (GB); Simon Overell, Hitchin (GB)

(73) Assignee: Google Inc., Mountain View, CA (US)

( * ) Notice: Subject to any disclaimer, the term of this patent is extended or adjusted under 35 U.S.C. 154(b) by 489 days.

(21) Appl. No.: 13/855,438

(22) Filed: Apr. 2, 2013

(65) Prior Publication Data

US 2013/0227393 A1 Aug. 29, 2013

Related U.S. Application Data

(63) Continuation-in-part of application No. 13/698,249, filed as application No. PCT/EP2012/057328 on Apr. 20, 2012, which is a continuation-in-part of application No. 13/163,154, filed on Jun. 17, 2011, now Pat. No. 9,147,199.

(30) Foreign Application Priority Data

Sep. 14, 2011 (GB) .................................. 1115904.3

(51) Int. Cl.
G06F 17/20 (2006.01)
G06F 17/22 (2006.01)
G06Q 30/02 (2012.01)

(52) U.S. Cl.
CPC ........... *G06F 17/2247* (2013.01); *G06Q 30/02* (2013.01)

(58) Field of Classification Search
CPC ..... G06F 17/2247; G06F 17/24; G06F 17/211
See application file for complete search history.

(56) References Cited

U.S. PATENT DOCUMENTS 5,907,681 A * 5/1999 Bates ................ G06F 17/30899
707/E17.119
6,477,575 B1 11/2002 Koeppel et al.
(Continued)

FOREIGN PATENT DOCUMENTS

JP 2011-048765 3/2011
WO WO-2011/005948 1/2011

OTHER PUBLICATIONS

Adobe Flash Platform®, "Application Frame Rate" (May 24, 2010), (available at http://help.adobe.com/en_US/as3/mobile/WS948100b6829bd5a61c0b0b612763986266-8000.html) (retrieved May 17, 2015).*

(Continued)

*Primary Examiner* — Stephen Hong
*Assistant Examiner* — Shahid Khan
(74) *Attorney, Agent, or Firm* — Foley & Lardner LLP; John D. Lanza (57) ABSTRACT

A technique is provided to determine whether a region within a web page is viewable to a user through a browser window. Often, browsers will only show part of a web page at given time, creating a difficulty in establishing whether a region of the web page, which may be an advertisement for example, is in view. This is addressed by providing one or more test features within the region, rendering the web page, monitoring a behavioral characteristic of the test features and determining whether the region is in view based on the monitored behavioral characteristic, wherein the behavioral characteristic varies according to whether the test feature is currently being displayed. One example of a behavioral characteristic is a frame progression rate. Browsers will typically redraw elements of a web page at a higher rate if they are currently in view through the browser window, and this characteristic can therefore be used to determine whether the test feature, and thus the region, is in view. The (Continued)

present invention finds particular utility where the region contains an advertisement, as it allows an advertiser to discover whether the advertisement has been seen by users.

21 Claims, 7 Drawing Sheets (56) References Cited

U.S. PATENT DOCUMENTS

| | | | |
|---|---|---|---|
| 7,567,916 | B1 | 7/2009 | Koeppel et al. |
| 2005/0114430 | A1 | 5/2005 | Zheng et al. |
| 2007/0061412 | A1 | 3/2007 | Karidi et al. |
| 2007/0118640 | A1 | 5/2007 | Subramanian et al. |
| 2009/0019148 | A1 | 1/2009 | Britton et al. |
| 2009/0326966 | A1 | 12/2009 | Callaghan et al. |
| 2010/0088373 | A1 | 4/2010 | Pinkham |
| 2011/0029393 | A1* | 2/2011 | Apprendi ........... G06Q 30/0277 705/14.73 |
| 2011/0055023 | A1 | 3/2011 | Mcneeley et al. |
| 2011/0078029 | A1 | 3/2011 | Bickle |
| 2011/0082755 | A1 | 4/2011 | Itzhak |
| 2011/0137733 | A1 | 6/2011 | Baird et al. |
| 2012/0151360 | A1* | 6/2012 | Molander ................. G06F 9/54 715/736 |
| 2012/0324098 | A1 | 12/2012 | De Jager et al. |

OTHER PUBLICATIONS

Adobe Flash Platform®, "Application Frame Rate" (May 24, 2010), (available at http://help.adobe.com/en_US/as3/mobile/WS948100b6829bd5a61c0b0b612763986266-8000.html) (retrieved Dec. 3, 2015).*

International Preliminary Report on Patentability on Application No. PCT/EP2012/057328 dated Dec. 17, 2013.
International Search Report on Application No. PCT/EP2012/057328 dated Dec. 20, 2012.
Office Action on U.S. Appl. No. 13/163,154 dated Jan. 8, 2013.
Office Action on U.S. Appl. No. 13/163,154 dated May 20, 2013.
Office Action on U.S. Appl. No. 13/163,154 dated Jun. 12, 2014.
W3C: "Page Visibility (W3C Working Draft Jun. 2, 2011)", Jun. 2, 2011, XP002678630, Retrieved from the Internet: URL:http://www.w3.org/TR/2011/WD-page-visibility-20110602/[retrieved on Jun. 6, 2012] Section 1: "Introduction" Section 4: "Page Visibility".
Written Opinion on Application No. PCT/EP2012/057328 dated Dec. 17, 2013.
Notice of Allowance on U.S. Appl. No. 13/163,154 dated Feb. 9, 2015.
Notice of Allowance on U.S. Appl. No. 13/163,154 dated Jun. 22, 2015.
Office Action on U.S. Appl. No. 13/698,249 dated Apr. 10, 2015.
Office Action on U.S. Appl. No. 14/531,532 dated Jan. 28, 2015.
Office Action on U.S. Appl. No. 14/531,532 dated Jul. 17, 2015.
Office Action on U.S. Appl. No. 14/687,595 dated Jul. 8, 2015.
Office Action on U.S. Appl. No. 13/163,154 dated Nov. 13, 2014.
Australian First Examination Report on 2012269416 dated Oct. 29, 2015.
Chinese Office Action on 201280039401.7 dated Feb. 29, 2016.
Japanese Office Action on 2014-515107 dated May 23, 2016.
Notice of Allowability on U.S. Appl. No. 14/531,532 dated Feb. 11, 2016.
Notice of Allowance U.S. Appl. No. 14/531,532 dated Jan. 21, 2016.
Office Action on U.S. Appl. No. 13/698,249 dated Nov. 6, 2015.
Office Action on U.S. Appl. No. 14/687,595 dated Oct. 29, 2015.

* cited by examiner

METHOD TO DETERMINE WHETHER ADVERTISEMENTS IN A WEB PAGE ARE IN VIEW

CROSS-REFERENCE TO RELATED APPLICATIONS

This application is a continuation-in-part of U.S. patent application Ser. No. 13/698,249, filed Nov. 15, 2012, which claims benefits to U.S. patent application Ser. No. 13/163,154, filed Jun. 17, 2011. The present application claims benefit of and priority to each of those applications and the entire disclosures of those applications are hereby incorporated herein by reference. This application further claims benefit of and priority to PCT/EP2012/057328 for "ADVERTISEMENTS IN VIEW", filed 20 Apr. 2012, and claiming priorities to U.S. patent application Ser. No. 13/163,154, filed 17 Jun. 2011, GB Application No. 1115904.3, filed 14 Sep. 2011, each of which is hereby incorporated by reference in their entirety for all purposes.

FIELD OF THE INVENTION

The present invention relates to the delivery of content over a network, and to the analysis of whether that content is viewable by a user. In particular, but not exclusively, the present invention relates to the assessment of whether an advertisement in a web page is viewable by a user.

BACKGROUND TO THE INVENTION

Increasingly, online publication is replacing conventional, physical means for distributing content. For example, newspaper publishers are receiving increasing volumes of traffic at their websites, while selling fewer hard copies of the newspapers themselves. This presents a challenge for the publishers in terms of monetising the content they produce. While some publishers have instigated a pay-per-view or subscription service to access their online content, most have attempted to keep their online offerings free at the point of use. To support this model, publishers rely on advertising.

Indeed, advertising based revenue models are not limited to publishers of content but have been adopted by a large number of internet services. In selling advertisement space on a website, a decision has to be made as to the price that that space will cost. Today, advertising space is predominantly sold on either a pay-per-impression or a pay-per-click basis.

In a pay-per-impression model, a charge is levied each time the web page containing the advertisement is viewed. Records are kept each time a web page containing the advertisement is downloaded to a user, and a charge is levied to the advertiser according to the volume of downloads that have occurred.

A problem with current pay-per-impression techniques is that they do not accurately reflect whether the user engaged with the advertisement itself. Indeed, there is no indication as to whether the advertisement was even viewed by the user. For example, the advertisement may be on a part of the web page that was not viewable in the user's browser window, or may even have failed to load. This creates uncertainty as to the value of the advertisement to the advertiser, and thereby suppresses demand for internet advertising.

The pay-per-click model addresses some of these concerns. In this model, payment is made for each occasion on which the user clicks on a link within the advertisement. However, while this does ensure (in the absence of fraud) that payment is only made in the case where a user engages with the advertisement, it is not appropriate for all circumstances. For example, many advertisements are intended to increase brand awareness passively, and would not wish to interfere with the user's experience. In general, the number of clicks on an advertisement will not be simply a function of the number of views it receives, but will be affected by the success of that advertisement in enticing a click. Pay-per-click models are unable to distinguish between these factors.

Accordingly, it would be desirable to develop an approach which accurately reflects the number of times a particular advertisement has been viewed. Since the visibility of the advertisement is not ensured simply because the host web page has been downloaded, a greater degree of accuracy is required.

One proposed solution is to monitor the area of the web page which is shown by a particular user's browser at a given moment. For example, knowing the dimensions of the browser's viewport and the position of the advertisement in the web page, it can be established whether the advertisement is in view (that is, within the browser's viewport) by observing the scroll position of the browser window (i.e. its vertical and horizontal position on the web page). Another solution alternatively or additionally senses the position of the mouse cursor on the web page.

While these solutions can provide accurate data in the right circumstances, they are in practice of limited use. This is due to restrictions on the information that parties within the process are able to derive.

In particular, advertisements are often contained within (nested) iframes in a host web page. An iframe provides a region within a web page in which other web content may appear.

One important benefit of iframes for the publisher is that content within the iframe is unable to affect content in the host web page or even discover information regarding that page, as long as the iframe and the host web page are served from different domains. This means that the publisher can be secure in the fact that the advertisement will not corrupt the main content of the host web page.

However, since content within the iframe is not able to interact with the host web page, it is not possible for any client-side code served with the advertisement to discover, for example, the dimensions (height and width) of the host web page, or where the browser viewport is in relation to the host web page. Accordingly, it is not possible for any such client-side code to be used to discover whether the advertisement is in view. As such, when an iframe is used to serve an advertisement, techniques which attempt to infer whether an advertisement is in view from the location of the browser viewport relative to the host web page do not function. (c.f. http://web.archive.org/web/20110707192023/http://www-.realvu.net/iframes/).

Accordingly, it would be desirable to provide a technique for establishing whether an advertisement has been viewed, even when the advertisement is served within an iframe or some other such restricted or sandboxed environment.

SUMMARY OF THE INVENTION

According to a first aspect of the present invention, there is provided a computer implemented method for determining whether a region within a web page is in view, comprising:

providing at least one test feature in the region;
rendering the web page;

monitoring a behavioural characteristic relating to the at least one test feature; and determining from the monitored behavioural characteristic whether the region is in view or not in view, wherein the behavioural characteristic comprises a redraw rate of the test feature.

So, the present invention is able to assist in providing information as to whether a region within a web page is in view without requiring knowledge of the characteristics of the host web page. During rendering of the web page, behavioural characteristics that vary according to whether a test feature in the region is currently being displayed can be monitored to establish whether the region is in view or not in view. In this context, "in view" indicates that the region is within the browser's viewport, i.e. within a viewable portion of a web page that is shown by the browser.

However, while the presence of the region within the browser's viewport is a necessary requirement, it may not be sufficient. For example, although in the browser's viewport, a region may be obscured from the user as a result of being in a background tab or for another reason. Thus, in general, a region is "in view" if it is viewable by a user and "not in view" if it is not viewable by a user, for whatever reason. In particular preferred embodiments, the region contains an advertisement, and in this way information as to whether an advertisement is in view can be derived.

The present invention can take advantage of the fact that web browsers and web-browser plugins make particular provisions whereby, for example, elements of a web page that are viewable within the browser viewport may be redrawn more frequently than elements that are on the web page but in an area not currently contained within the browser's viewport. This behavioural difference, together with others like the clock rate or the number of local connections that can be made, is the result of efforts to reduce unnecessary processing of elements of web pages that are not currently in view. The present invention can make use of this behavioural difference to infer information regarding whether test features are in view, and, from this, whether advertisements are in view Accordingly, behavioural characteristics may relate to the manner in which the one or more test features are handled during rendering of the web page. For example, in preferred embodiments, the step of monitoring a behavioural characteristic comprises monitoring behaviour of an application programming interface (API), such as a browser API or a plugin API, as it relates to the at least one test feature. The behaviour of an API may be monitored directly or indirectly. For example, a plugin might receive a clipping rectangle from the browser, through the "NPP_SetWindow" call in the Netscape Plug-in Application Programming Interface (NPAPI), detailing which portion of a drawable feature is currently in view. Using this information the plugin may vary the frame progression rate of a test feature it is generating. In certain embodiments client-side code associated with a test feature could be provided to monitor the browser NPAPI to determine whether part of or the whole of the test feature is in view. In other embodiments, client-side code could be used to monitor the frame progression rate of the plugin associated with the test feature. In some preferred embodiments, the plugin API is provided by the Flash environment.

In some preferred embodiments, the step of monitoring the behavioural characteristic comprises monitoring events indicative of the test feature being in a suppressed state. For example, some environments provide events when a feature enters or leaves a suppressed state such as a throttle state. A particular example occurs in Adobe Flash 11.2 and later versions, in which a "ThrottleEvent" event reflects the throttle state of the feature.

In preferred embodiments, the step of monitoring the behavioural characteristic is carried out by code operating in a restricted environment such that it is prevented from discovering features of the host web page. In preferred embodiments, the restricted or sandboxed environment in which the code operates is an iframe (potentially nested within other iframes) within the host web page. The present invention finds particular utility in the context of iframes since it does not require knowledge of the host web page, instead monitoring a behavioural characteristic of the test feature itself which varies according to whether that feature is being displayed. This is especially valuable when the content of the iframe and the host web page are served from different domains, since in these circumstances it is not possible for elements served within the iframe to interact with or discover information about the host web page.

Examples of restricted environments that may be used as an alternative or in addition to an iframe in the context of the present invention include: a frame; a Microsoft Web Sandbox; a dojox.secure.sandbox from the Dojo Toolkit; a Scalable Vector Graphics (SVG) document; or Cajoled script generated by Caja. Restricted environments may prevent the code carrying out the monitoring of the behavioural characteristic from having access to some or all of: the position of the region relative to the host web page; the vertical and horizontal scroll positions of the viewport of the host page; and the dimensions of the viewport of the host web page.

In preferred embodiments, the behavioural characteristic comprises a frame progression rate of the test feature. For example, the behavioural characteristic may be the rate at which frames within a Adobe Flash Small Web Format (SWF) applet progress. Alternatively or additionally, the behavioural characteristic may comprise a timer clock rate and/or the rate at which local connections can be made. In other examples, the behavioural characteristic may be animation timing of the at least one test feature or the rate at which a browser calls a browser plugin to repaint itself. In particular, animation timing may be monitored through a WindowAnimationTiming API.

In preferred embodiments, the step of monitoring the behavioural characteristic occurs at a client device, and the method further comprises: transmitting information relating to the behavioural characteristic from the client device to a server. Monitoring the behavioural characteristic at client devices is an efficient way to obtain information as to the activity of that client device, while recording information at a central server allows results to be collated from a number of sources. As such, this aspect of preferred embodiments makes optimal use of the architecture of a client-server network.

Preferably, the at least one test feature is any of: an element; a document; a plugin; or an applet. In preferred embodiments, the at least one test feature is an applet, such as an Adobe Flash SWF, Java or Silverlight applet. In one particular preferred embodiment, the at least one test feature is an Adobe Flash SWF applet and the step of monitoring a behavioural characteristic comprises monitoring a plugin API provided by the Flash environment.

In preferred embodiments, the step of monitoring the behavioural characteristic is carried out by client-side code. Client-side code is code which operates on a client device. The client device in this context is the device which displays the host web page to the user. The client-side code may take the form of, for example: client-side script; an applet; or a plugin. In particular, client-side script may be implemented in at least one of: ECMAScript, JavaScript, Jscript, VBScript, ActionScript or OpenGL Shading Language (GLSL).

In preferred embodiments, the step of determining whether the region is in view or not in view comprises determining one or more of: the proportion of the at least one test feature that is in view; the height and width of the at least one test feature that is in view; whether any part of the at least test feature is in view; and whether all of the at least one test feature is in view. By analysing these details of whether the test feature is in view, a more detailed picture can be established regarding which parts of the region are in view.

Preferably, the step of determining whether the region is in view comprises comparing the monitored behavioural characteristic with one or more control values. For example, the control values may be used as threshold values, whereby if the behavioural characteristic exceeds a certain value the region is determined to be in view (or not in view, as appropriate). This is an efficient method of judging whether a frame progression rate indicates that the region is in view or not. For example, the test features can be determined as in view if the frame progression rate exceeds a threshold value.

In some preferred embodiments, the method further comprises generating a control feature which is not viewable, monitoring a behavioural characteristic of the control feature, and determining the at least one comparison value in dependence on the monitored behavioural characteristic of the control feature. A control feature that is not viewable is one that will not be displayed to a user in any circumstances. This aspect of the present invention makes use of the fact that a browser or plugin will render features of the web page at a nominal rate, even if those features are located such that they will never be shown. For example, should the test feature be delivered in an iframe and the control feature also be delivered in the iframe, the control feature may be located outside the visible dimensions of the iframe meaning that it is never shown to the user (since any aspect of the iframe is unable to influence the host web page). Accordingly, the behavioural characteristic of the control feature can give an impression of the likely behavioural characteristic of the test feature when it is not in view. For example, the frame progression rate of the test feature can be compared with the frame progression rate of the control feature, and the test feature can be considered in view if its frame progression rate exceeds that of the control feature.

In some preferred embodiments, the method further comprises varying the position of the test feature between a position within the test region and a position in which the test feature is not viewable. Accordingly, the test feature may be a dynamic test feature. In this context, determining whether the region is in view or not in view may comprise determining whether the monitored behavioural characteristic varies as the position of the test feature is varied.

In some circumstances, the control value with which the behavioural characteristic of the test feature is compared is chosen in dependence on a previously determined state of the test feature. In particular, the control value may be chosen in dependence on whether the test feature was previously considered to be in view or not in view. For example, the control value for a test feature to be determined as in view when the test feature has previously been determined as not in view may be greater than the control value if the test feature has previously been determined as in view. This may help account for changes in the conditions in which the browser or plugin operates, and limits the chance that minor fluctuations due to external factors will be interpreted as a change of state of the test features from in view to not in view or vice versa.

Alternatively or additionally, the set of comparison values may be determined using heuristic or empirical methods. These methods may take account of the circumstances in which the web page is rendered, such as the browser used to render the web page or the operating system environment. As such, allowances can be made for other reasons for variation in the redraw rate which do not depend on whether the feature is in view or not in view.

Preferably, the at least one test feature is located at an edge of the region in which the advertisement is found. This means that values retrieved from the test feature can clearly establish whether that edge of the region is in view or not. In preferred embodiments, a plurality of test features are located at edges of the region. In this manner, the invention can assist in determining whether the whole of the advertisement or a particular proportion of the advertisement is in view or not in view. In particular embodiments, at least some of the test features are located at corners of the region.

In preferred embodiments, the at least one test feature is transparent and/or a test pixel. These aspects limit the impact of the at least one test feature on the region in which the advertisement is found, allowing it to serve its primary purpose.

In preferred embodiments, an advertisement is provided in the region. This is particularly valuable context in which to discover whether the region is in view, and may provide significant commercial advantages. In some preferred embodiments, the at least one test feature may form part of or the whole of the advertisement itself.

It can also be appreciated that the invention can be implemented using computer program code. Indeed, according to a further aspect of the present invention, there is therefore provided a computer program product comprising computer executable instructions for carrying out the method of the first aspect. The computer program product may be a physical storage medium such as a Read Only Memory (ROM) chip. Alternatively, it may be a disk such as a Digital Versatile Disk (DVD-ROM) or Compact Disk (CD-ROM). It could also be a signal such as an electronic signal over wires, an optical signal or a radio signal such as to a satellite or the like. The invention also extends to a processor running the software or code, e.g. a computer configured to carry out the method described above.

According to a further aspect of the present invention, there is provided a device for determining whether a region within a web page is in view, comprising:
provide at least one test feature in the region;
render the web page;
monitor a behavioural characteristic relating to the at least one test feature; and
determine from the monitored behavioural characteristic whether the region is in view or not in view,
wherein the behavioural characteristic comprises a redraw rate of the test feature.

BRIEF DESCRIPTION OF THE FIGURES

Preferred embodiments of the present invention will now be described with reference to the accompanying drawings, in which.

DETAILED DESCRIPTION

Figure 1:
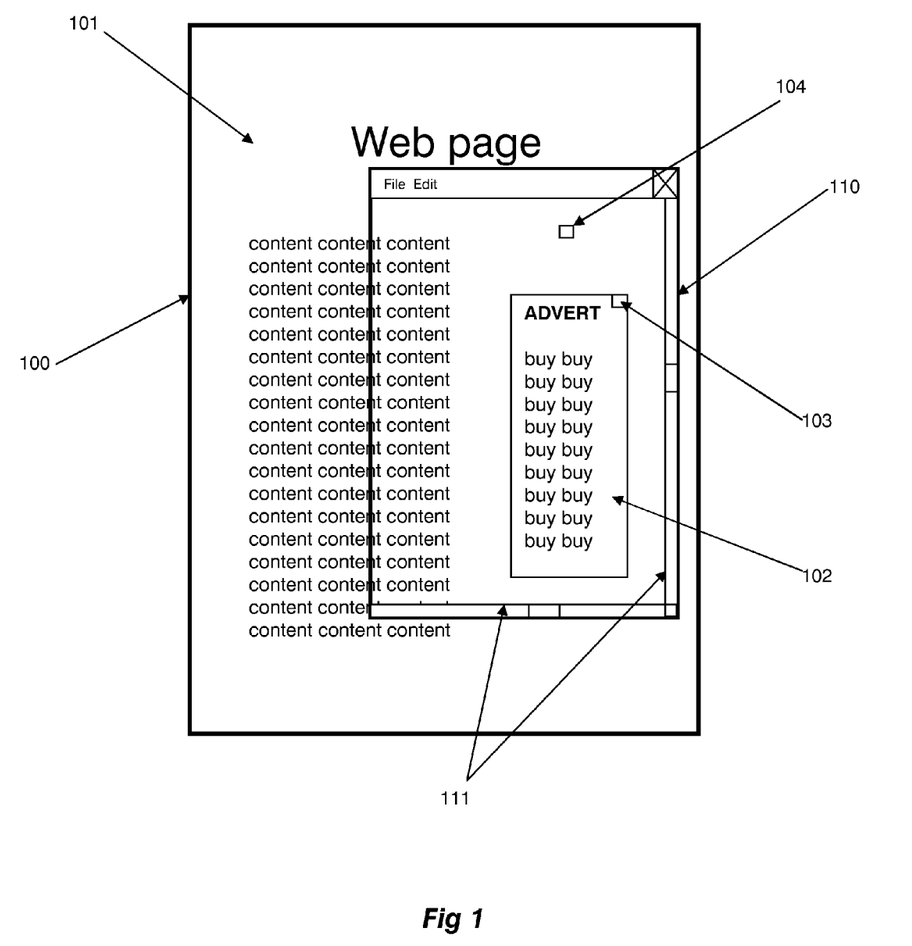
FIG. 1 illustrates the viewable portion of a web page containing an advertisement.

Referring to FIG. 1, a web page 100 is shown. The web page comprises a main area 101 in which content is displayed. The web page further comprises an advertisement 102. In this example, the advertisement 102 is contained within an iframe.

FIG. 1 also illustrates a browser window 110. Only elements of the web page 100 which appear within a viewable portion of the browser window 110 are viewable to a user at a particular time. These elements of the web page 100 are said to be in view. Elements which are not contained within a viewable portion of the browser window 110 are said to be not in view.

It is known that a user accessing the web page 100 will be able to move the browser window 110 around the web page 100 to view different elements of the page 100. The position of the browser window is indicated by the scroll bars 111. The user may also be able to zoom in or zoom out of the host web page 100, a process which effectively changes the size of the browser window 110 relative to the host web page 100. As a result of this, certain elements of the web page 100 will be in view at some times and not in view at others.

As explained in the background above, this creates a difficulty in establishing whether the advertisement 102 is in view, which will of course be of interest to the advertiser producing the advertisement 102 when deciding its value. One prior art solution relies on knowledge of the position of the scroll bars 111. However, this information cannot be discovered by elements provided with the advertisement 102, since this is contained within an iframe on an external domain. This is because iframes are specified to isolate the host web page 100 from content contained within the iframe.

In alternative embodiments, other restricted or sandboxed environments than iframes could be used, for example a frame; Microsoft Web Sandbox; dojox.secure.sandbox from the Dojo Toolkit; an SVG document; or Cajoled script generated by Caja. Alternatively or in addition to sandboxing the client-side monitoring code could be restricted to a limited subset of available features, for example ADsafe; ECMAScript 5 strict mode; or Cajita.

FIG. 1 also shows a test feature 103 provided within the advertisement 102 and a control feature 104 located outside of the visible bounds of the iframe but still delivered through the iframe. The test feature 103 and the control feature 104 are both provided through the iframe containing the advertisement 102. As a result, the control feature 104 will never be viewable to the user since it is in a region outside of the iframe which therefore cannot be affected by content delivered through the iframe. Instead, the control feature 104 is used to understand the browser's response to elements of the page which are not in view, as will be described in greater detail below. Additionally, to remove all intrusion the test feature 103 is placed behind the advertisement 102.

The test feature 103 and the control feature 104 may be implemented as test and control pixels respectively. For example, the test feature 103 may be a single, transparent test pixel overlaid on the advertisement 102. In this way, the test feature 103 provides minimal intrusion into the functionality of the advertisement 102.

Figure 2:
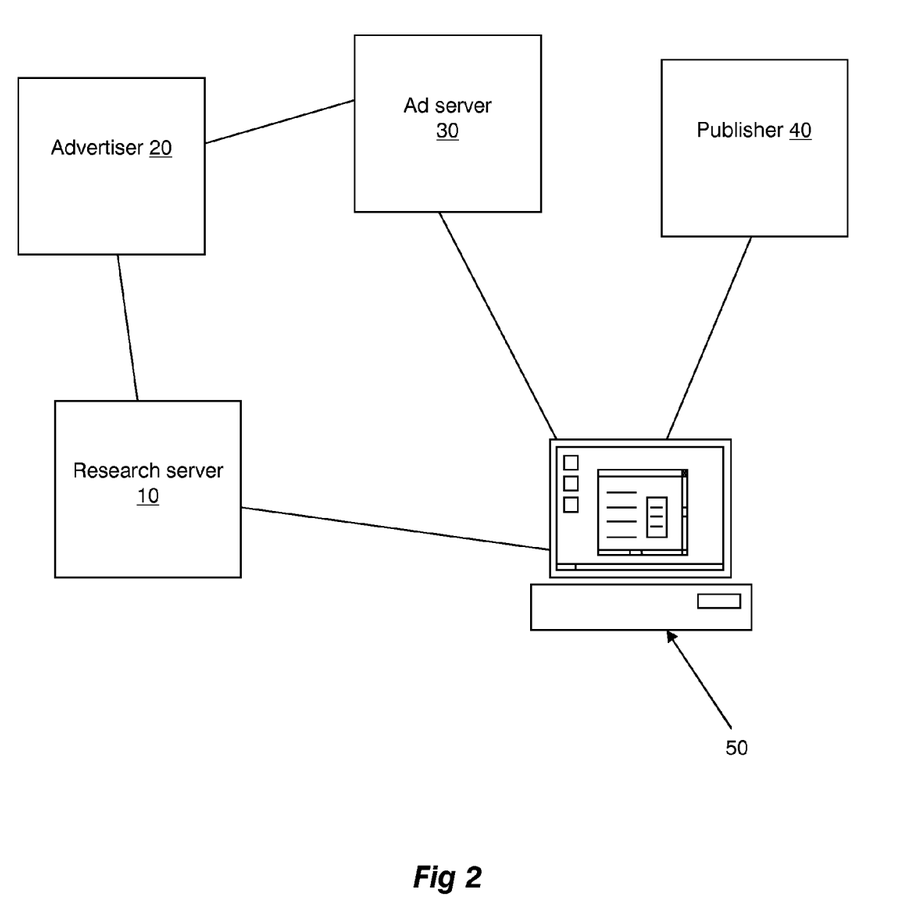
FIG. 2 shows a system for delivering content to a user.

FIG. 2 illustrates a system for the delivery of content to a user that may be used in accordance with the present invention. The system comprises a research server 10, an advertiser 20, an ad server 30, a publisher 40 and the client device 50 operated by the user. FIG. 2 also indicates communications channels between these features. These communications may take place over any type of appropriate communications network, including Local Area Networks (LANs), Wide Area Networks (WANs) and so on, but in a preferred embodiment each of the research server 10, the advertiser 20, the ad server 30, the publisher 40 and the client device 50 are connected to the internet and this is used to carry out communications between these features.

The research server 10, the advertiser 20, the ad server 30 and the publisher 40 may be implemented using conventional computer server systems. Each of these participants in the system may represent a single computer server or may represent a collection of computer servers as appropriate. The skilled person will also recognise that various participants may share computer hardware or be hosted on the same machines if convenient.

The client device 50 may be implemented as any network enabled device. For example, the client device 50 may be implemented as a personal computer, laptop computer, tablet computer, smartphone or the like. In preferred embodiments, the client device 50 is an internet enabled device, but the skilled person will appreciate that alternative methods for delivering content to the client device 50 may be employed.

Figure 3:
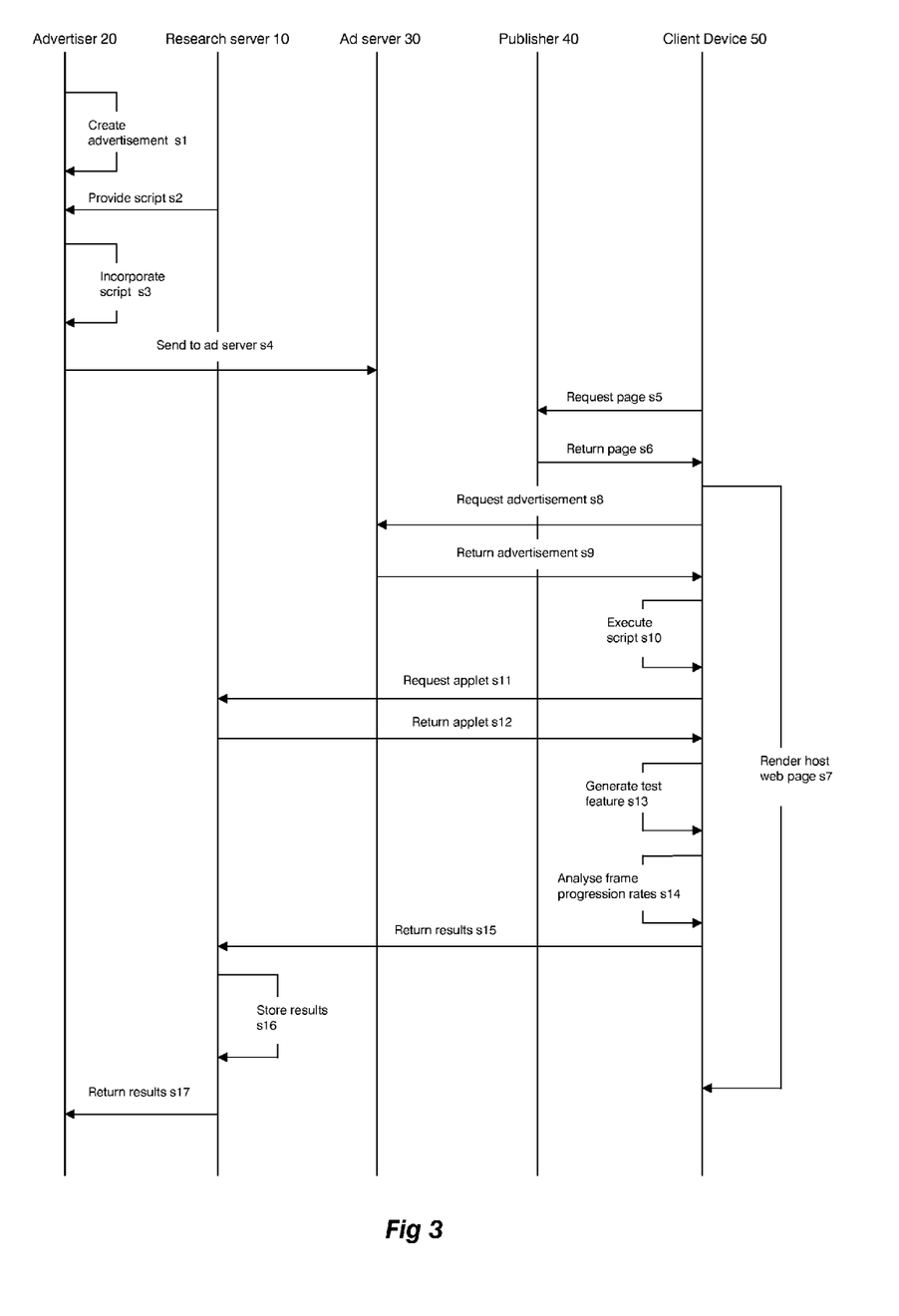
FIG. 3 shows the operation of the system of FIG. 2 during an exemplary delivery of content to the user.

The operation of this embodiment of the present invention will now be described with reference to FIG. 3, which shows the activities of each of the participants illustrated in FIG. 2 during the delivery of a web page 100 to a client device 50.

At step s1, the advertiser 20 generates an advertisement 102. The advertisement 102 may provide information about a product sold by the advertiser 20, for example, and may include elements such as text, images, moving images, sound or a combination of these. The advertisement 102 may also include one or more hyperlinks, so that when the advertisement 102 is rendered by the client device 50, it is possible to select these hyperlinks in order to be redirected to further content provided by the advertiser 20. The advertisement may be encoded by the advertiser as a HyperText Mark-up Language (HTML) file.

At step s2, the research server 10 sends client-side code to the advertiser 20 for incorporation in the advertisement 102. In one example, the client side code is JavaScript. The client-side code is designed to allow the research server to retrieve information as to whether the advertisement 102 is in view when served with the web page 100, as will be explained in greater detail below.

The client-side code is incorporated into the advertisement 102 at step s3, and is then sent by the advertiser 20 to the ad server 30 at step s4. In this example, the advertiser 20 can be understood as an organisation which wishes to promote a product, while the ad server 30 is operated by an organisation which offers to find advertising space for the advertiser 20. Accordingly, the ad server 30 has a relationship with multiple advertisers and multiple publishers, and acts as an intermediary to assist in the placement advertisements with suitable publishers.

So, the advertisement 102 including the client-side code provided by the research server 10 is now hosted by the ad server 30. The ad server 30 has a relationship with the publisher 40 by which advertisements are provided in the publisher's content. This is effected by the publisher 40 incorporating links to the ad server 30 in web pages it provides to users. These links are delivered within iframes. This is beneficial to the publisher 40 as content delivered in the iframe is isolated from affecting the host web page, and therefore the publisher 40 can be certain that the advertisements provided by the ad server 30 will not adversely affect the content it is publishing in the host web page.

Accordingly, a client device 50 may request a web page 100 from the publisher 40, at step s5. The web page 100 is then returned to the client device 50 at step s6. The client device then renders this web page at step s7. The rendering process is typically undertaken by a browser operating on the client device 50.

As explained above, the web page 100 contains an iframe. The iframe is linked to an address at the ad server 30. Thus, when the browser operating at the client device 50 attempts to render the web page 100, it will be instructed by the iframe to call further information from the ad server 30 to populate the iframe. This request is transmitted from the client device 50 to the ad server at step s8.

On receiving the request, the ad server 30 decides what content to return to the client device 50. In this example, the ad server 30 returns the advertisement 102 provided by the advertiser 20 in which the client side code provided by the research server 10 has been incorporated, as described above. At step s9, the advertisement 102 is returned to the client device 50.

As mentioned above, the advertisement 102 contains the client side code provided by the research server 10. The client side code is executed by the client device at step s10 as part of the process of rendering the web page 100. When the client side code is executed by the client device 50, it is effective to request two identical applets, one for the test feature 103 and one for the control feature 104, from the research server 10, at step s11. At step s12, the applets are returned to the client device 50. (In practice, the web browser may employ its cache to reduce these two requests for an identical resource into a single request.) The applets may be, for example, Adobe Flash SWF applets, although the skilled person will recognise that other types of applet or resource may be used. In the preferred embodiment Adobe Flash SWF applets are provided and executed within the Flash environment. The Flash environment, by proxy, provides access to the browser API.

At step s13, the client-side code requested by the research server embeds the applets. The applets are embedded to form the test feature 103 and the control feature 104. Since the control feature 104 is located in an area of the web page 100 outside of the visible boundaries of the iframe, the browser will never show the control feature 104 and will always treat it as if it is not in view. On the other hand, the browser will treat the test feature as in view when it falls within the browser window 110 and not in view when it is outside the browser window 110.

As the browser renders the web page 100, to handle the Adobe Flash SWF applets it will make calls via the browser API which allows the Flash environment to determine whether a feature is in view or not in view; for instance Safari on Mac OS X supplies the Flash environment with details of the clipping rectangle whenever the window geometry changes via the NPAPI. This increases efficiency of the browser by allowing the plugin to redraw elements that are known to be out of view at a lower rate than those elements which are known to be in view. Thus, the rate at which the plugin will progress the animation frames of the test feature 103 will depend on whether it is in view or not in view. Accordingly, the rate at which the animation frames progress, or the frame progression rate, is a behavioural characteristic relating to the test feature which varies according to whether the test feature 103 is being displayed, i.e. whether the test feature is in view or not in view. In this embodiment, the frame progression rate is used as a behavioural characteristic, but it is recognised that other characteristics may alternatively or additionally be used. For example, characteristics such as a timer clock rate and/or the rate at which local connections can be made may vary according to whether a test feature is currently being displayed. In some other examples, the behavioural characteristic may be a report from the browser API which directly indicates whether the test feature is or is not being displayed.

At step s14, the client side code records the rate at which the test feature's 103 and the control feature's 104 frames are progressed and uses these frame progression rates to determine whether the advertisement 102 is in view.

The frame progression rate of the test feature 103 can be compared with one or more control values. In this embodiment, at least one control value acts as a threshold value and is determined from the frame progression rates of the control feature 104. Typically direct comparison with the frame progression rates of the control feature 104 is insufficient because of measurement error and also because of fluctuating frame progression rates of the control feature 104 during scrolling (i.e. as the viewport is moved relative to the host web page 100). The process of comparison also typically requires the application of some smoothing model, because, for example, the recorded frame progression rates during state transition (i.e. during transitions from being in view to not in view and vice versa) are noisy. Given that the control feature 104 is always treated by the browser as not in view and the threshold is dependent on the frame progression rate of the control feature 104, if the frame progression rate of the test feature 103 is, when compared, the same as or less than the threshold, it can be deduced that the test feature 103 is not in view. Alternatively, if the frame progression rate of the test feature 103 is, when compared, greater than the threshold, then the test feature 103 can be determined to be in view.

Since the test feature 103 is located within the same region of the web page as the advertisement 102, determining whether the test feature 103 is in view provides an indication of whether the advertisement 102 is in view. As such, the client side code acts to analyse whether or not the advertisement 102 is in view by generating the test feature 103 and observing the rate at which its frames progress.

The client side code causes the client device 50 to return the results of this analysis to the research server 10, at step s15. The research server 10 stores these results at step s16. The research server 10 may thus collate results of this kind each time an advertisement 102 within a web page 100 is in view and not in view at client device 50. Thus the research server is able to provide information, at step s17, to the advertiser 20, indicating the exposure that was provided to the advertisement 102 by the arrangement with the ad server 30. Accordingly, the advertiser 20 is able to make informed commercial decisions as to the value of advertising in this way.

Figure 4A:
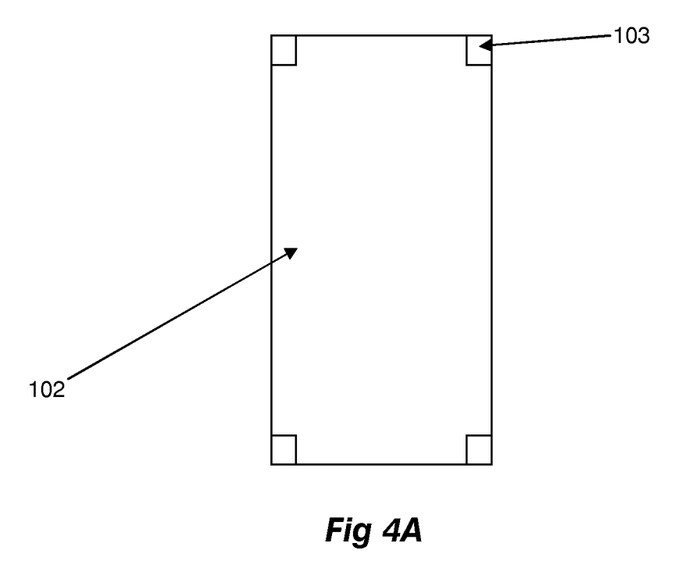
FIGS. 4A and 4B illustrate various arrangements of test features within an advertisement.
Figure 4B:
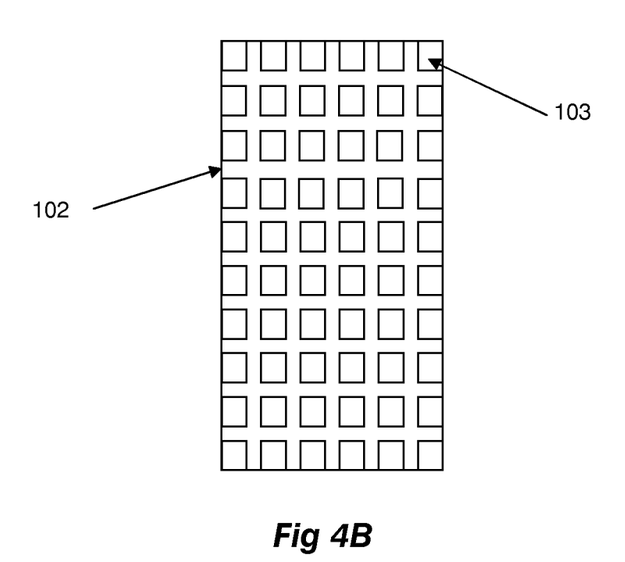

In the embodiment described above, a single test feature 103 is provided in the region in which the advertisement 102 is found. However, in other embodiments, multiple test features 103 may be used. Examples of arrays of test features that may be used are shown in FIGS. 4A and 4B. Using an array of test features 103 can assist in determining whether the whole of the advertisement 102 is in view, or even which particular parts of an advertisement 102 are in view.

In the embodiment shown in FIG. 4A, a test feature is provided at each of the four corners of the advertisement 102. In the given example it is known that the advertisement 102 and the browser window are rectangular and have aligned axes, it can therefore be determined with confidence that if all the test features 103 are in view then the entire advertisement 102 is in view. In fact, in these circumstances, such confidence may be achieved by a single pair of test features 103 placed at diagonally opposite corners of the advertisement 102.

In FIG. 4B, a repeating array of test features 103 is provided across the full extent of the advertisement 102. In this embodiment, when only a portion of the advertisement 102 is in view, this can be established by observing the differential frame progression rates for individual test features 103.

As described above, the threshold value against which the frame progression rate of the test feature 103 is compared to determine whether the test feature 103 is in view can be established using a control feature 104. However, alternative methods can be used to establish the threshold. For example, the threshold may take a predetermined value, which may have been established from empirical experiments or using heuristic analysis. In an alternative embodiment, the threshold value may be chosen in dependence on analysed attributes of the client device 50, such as the browser rendering the web page 100, the hardware specifications of the client device 50, or the bandwidth of the client device's 50 network connection.

In some preferred embodiments, the threshold value depends on the previous state of the test feature 103. That is to say, the threshold value may vary according to whether the test feature 103 was previously determined to be in view or not in view. For example, the threshold value for judging a test feature 103 to be in view when it was previously not in view may be higher than the threshold value for judging the test feature to be not in view when it was previously in view. This approach can be understood as providing a hysteresis curve, as illustrated in FIG. 5.

Figure 5:
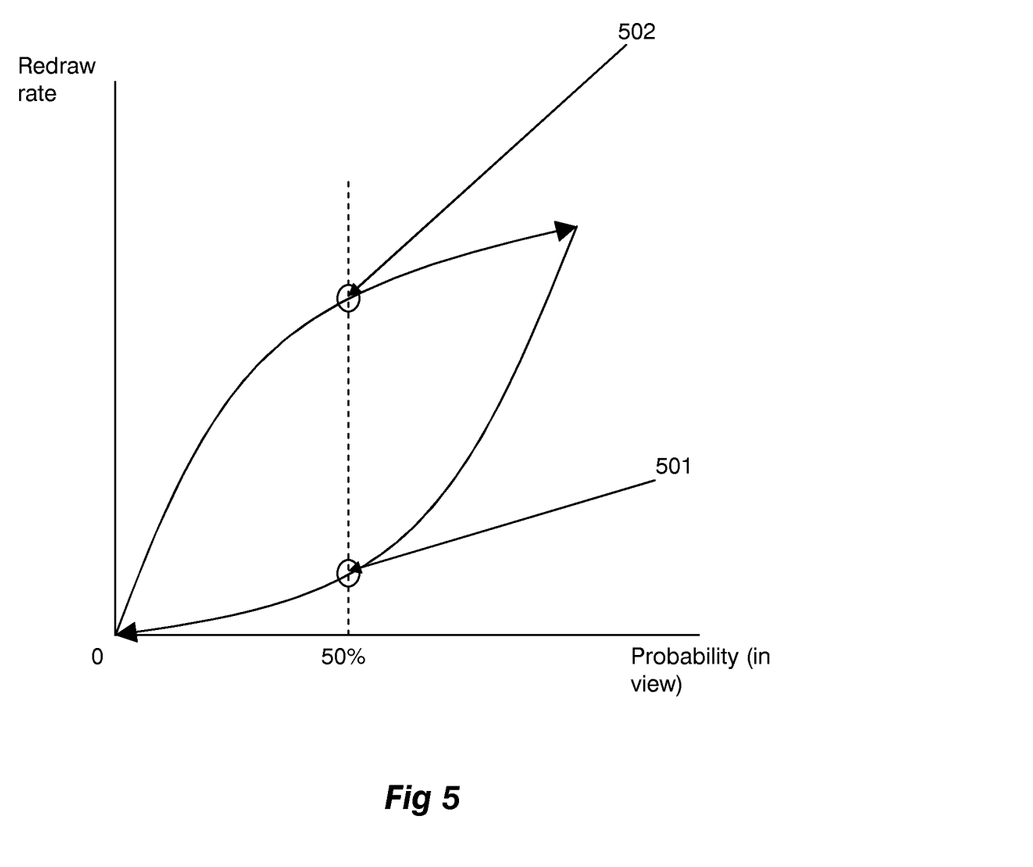
FIG. 5 illustrates the visualisation of a hysteresis curve to represent the use of different thresholds in different transitions.

In FIG. 5, the x axis represents an inferred probability that the test feature is in view while the y axis represents the frame progression rate. The test feature 103 is determined to be in view when the probability exceeds 50%. FIG. 5 illustrates that two threshold values may be appropriate in some circumstances, a lower threshold value 501 and a higher threshold value 502. The lower threshold value 501 applies when the test feature 103 was previously considered to be in view, while the higher threshold value 502 applies when the test feature 103 was previously considered to be not in view. In this way, variations in the redraw rate that might arise due to the performance of the client device 50 are inhibited from causing changes in the determined state of the test feature 103.

In some preferred embodiments, the lower threshold value 501 is established using a control feature 104 (i.e. the lower threshold value 501 is, or is determined in dependence on, the frame progression rate of the control feature 104) while the upper threshold value 502 is established empirically.

In the embodiments described above, the test features 103 are provided separately from the advertisement itself 102, meaning that the client side code provided by the research server 10 may be independent of the advertisement 102. In these cases the test features 103 are preferably transparent and relatively small (for example, each test feature 103 may be a single pixel) in order to avoid interfering with the content of the advertisement 102. This aspect may also limit the number of test features that are desirable in an array, since even if they are transparent, the test features 103 may interfere with hyperlinks provided in the advertisement 102. However, in other embodiments, the test features 103 may be aspects of the advertisement 102 itself which must be redrawn, and these can be monitored during the rendering of the web page 100 to determine whether they are in view or not. When the test features 103 are part of the advertisement 102 itself, it may be possible for the majority or the entirety of the advertisement 102 to be formed of test features 103 without compromising the functionality of the advertisement 102.

As described above, client side code is used to embed the test feature or test features 103 and monitor the frame progression rates. In alternative embodiments, the test feature or test features 103 may be served along with the advertisement 102 and the test feature or test features 103 may monitor and transfer the frame progression rates to the research server 10. In a further alternative embodiment, the test feature or test features 103 may be part of or the whole of the creative of the advertisement 102 itself. In other embodiments, the test feature or test features 103 could be inbuilt into the container or player of the advertisement.

In the preferred embodiments, the client side code may be an applet and may obtain information regarding the frame progression rates directly or indirectly via an external browser application programming interface (API) such as the Netscape Plug-in Application Programming Interface (NPAPI), the Pepper Plug-in Application Programming Interface (PPAPI), LiveConnect, XPConnect, the npruntime API, or ActiveX. In other examples, an internal browser API as made accessible to the restricted or sandboxed client-side code may be used to obtain indications as to whether the feature is in view.

As described above, one or more control values with which the behavioural characteristic of the test feature 103 is compared may be established empirically by observing a behavioural characteristic of the control feature 104. However, control values may also be established using heuristic methods. These heuristic methods may be developed using some or all of: the client device's User Agent (for example, the browser operating on the client device); the client device's operating system; or the client device's geographical location.

Figure 6:
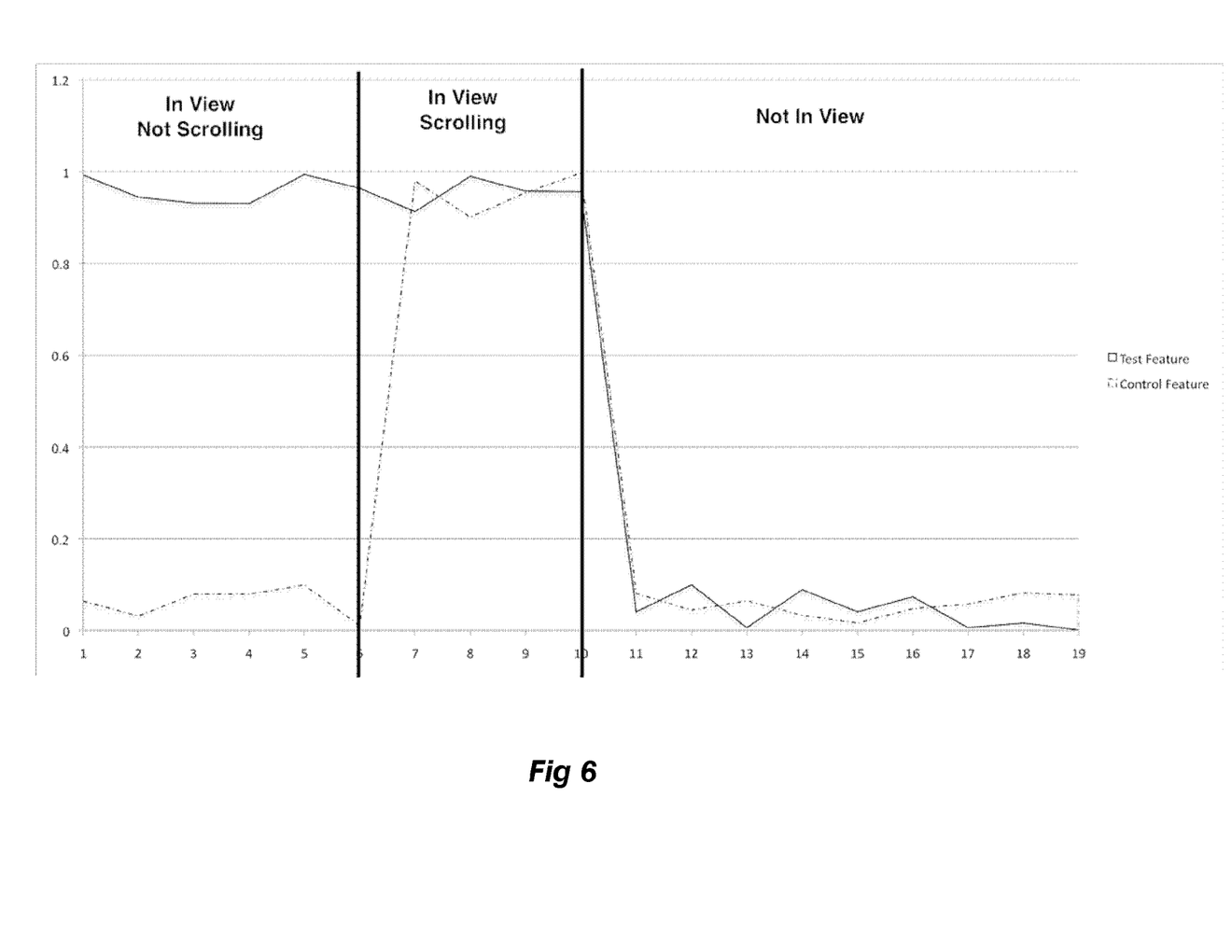
FIG. 6 shows the effect of scrolling on behavioural characteristics of a control feature and a test feature.

In addition to identifying whether the region is in view or not in view, the present invention may additionally identify other details regarding the region or parts of the region. In particular, in some preferred embodiments, a determination can be made as to whether the web page is scrolling. In particular, it is noted that a behavioural characteristic, such as the frame progression rate, or the test and/or control feature may vary according to whether the web page is scrolling. This variation can be used to establish whether the web page is scrolling. In one embodiment it can be determined that the region is in view and the page is scrolling when the frame progression rate of the control feature changes from a low state to a high state. This is illustrated in FIG. 6.

By making additional determinations, the classifications "in view" and "not in view" may be divided into sub classifications such as: "in view and scrolling"; "in view and not scrolling"; "not in view and out of viewport"; and "not in view and occluded".

Figure 7:
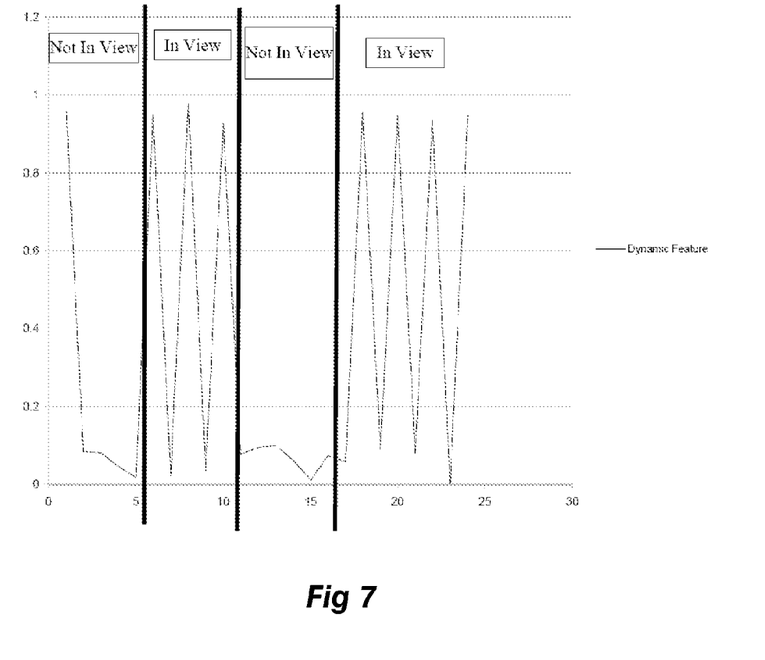
FIG. 7 illustrates the relationship between a behavioural characteristic of a dynamic test feature and whether the advertisement is in view or not in view.

In the embodiments described above, the behavioural characteristic of the test feature 103 is compared with a control value. For example, the behaviour of the test feature 103 is compared with the behaviour of a control feature 104. In another approach, a dynamic test feature 103 may be used. The position of the dynamic test feature 103 oscillates between a location in the region of interest, i.e. within the advertisement 102, and a region which is known to be not in view. If the behavioural characteristic of the test feature 103 varies as a result of this oscillation, then it can be assumed that the advertisement 102 is in view, whereas if no, or relatively little, variation occurs, then it can be assumed that the advertisement 102 is not in view.

This approach is illustrated in FIG. 7, which shows the behavioural characteristic (in this case the frame progression rate) of a dynamic test feature 103 when the advertisement 102 is in view and when it is not in view. It can be clearly seen from FIG. 7 that when the advertisement 102 is in view, the value of the behavioural characteristic for the dynamic test feature 103 varies significantly. This is due to the oscillation of the position of the dynamic test feature 103. In contrast, when the advertisement 102 is not in view, the oscillation of the test feature 103 has little or no effect on the behavioural characteristic.

In the example shown in FIG. 7, the initial value of the behavioural characteristic is relatively high, despite the fact that the advertisement 102 is not in view. This illustrates a circumstance in which browser behaviour is such that all elements are initially treated as in view, and the distinction in browser behaviour for different elements only occurs when an element undergoes a transition to take it out of view. Using a dynamic test feature 103 enforces such a transition due to the oscillation of the position of the test feature 103. This can ensure that the test feature 103 is not incorrectly considered to be in view.

Figure 8:
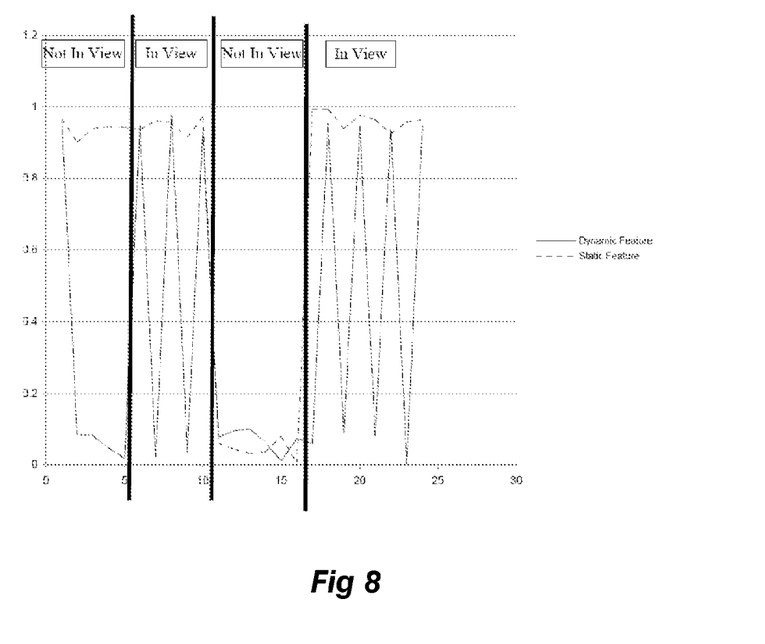
FIG. 8 compares the response of the behavioural characteristic of a static test feature and a dynamic test feature to whether the test feature is in view or not in view.

FIG. 8 shows the frame progression rate of both a static test feature 103 and a dynamic test feature 103 in these browser conditions. As can be seen from FIG. 8, the static test feature 103 will only be identified as not in view after a transition has occurred. For this reason, during an initial period when the static feature 103 is not in view, its behavioural characteristic fails to provide an adequate indication of this state.

In some preferred embodiments, a combination of at least one dynamic test feature 103 and at least one static test feature 103 may be used. The dynamic test feature 103 may be used to ensure that an initial state of being not in view is correctly recognised, as explained above, while the static test feature 103 may be used after at least one transition has occurred. The static test feature 103 may offer a more finely grained and less volatile classification than the dynamic test feature 103.

Preferably, the combination of dynamic and static test features is targeted towards the particular behaviour of the browser used to render the host web page 100.

The preferred embodiment described above utilises an applet, such as an Adobe Flash SWF applet, operating in a Flash environment. The frame progression rate can be monitored directly, or can be inferred by observation of an event which is indicative of whether the feature is in a suppressed state. For example, an event is provided in Flash 11.2 and later versions known as a "ThrottleEvent" event. ThrottleEvent allows a user to monitor when the runtime throttles, pauses or resumes normal activity through Flash events. In this way monitoring the behavioural characteristic can comprise monitoring events issued when a throttle state relating to processing of the test feature is modified.

In one example, an event listener is set to monitor ThrottleEvent.THROTTLE events. Changes in the throttle state cause an event to be passed to the listener, where this event identifies the new throttle state. Typically the throttle state is related to the frame progressions rate; for example, when the throttle state is "throttle" the frame progression rate may be in the range of 2 to 8 frames per second while when the throttle state is "pause" the frame progression rate drops to zero. When the throttle state is "resume" then the frame progression rate returns to the usual, pre-defined number of frames per second for elements that are in view.

In the above-described embodiment, the frame progression rate is used as a behavioural characteristic to assess whether a test feature 103 is in view or not in view. It should be understood that alternative behavioural characteristics may alternatively or additionally be used. As mentioned above, these may include features such as a timer clock rate and/or the rate at which connections can be made. Moreover, while the frame progression rate may be understood as the rate at which an entire frame is redrawn, more generally the redraw rate of the test feature may be used as the behavioural characteristic. The test feature is itself not necessarily static, and so each redraw of the test feature may draw a modified or new element compared with the previous iteration of the redraw process. That is to say, "redraw" does not necessarily imply the exact replication of a previously drawn element. For example, the test feature may comprise a plurality of test elements which are sequentially displayed.

One example of measurement of a redraw rate may take advantage of the MozPaintCount API currently available in the Firefox browser. Similar APIs may be incorporated into alternative browsers in future. The API provides a count of the number of times that an element has been drawn. By taking measurements of this count after a known period of time, information regarding the redraw rate can therefore be inferred. Since the redraw rate will depend on where the feature is in view or not in view, this allows a determination to be made about whether a frame containing the feature is visible.

In one example, the process may be providing an iframe containing a single <div> element which acts as the test feature 103. Subsequently, an endless loop is implemented in which the following steps occur: the paint count of the iframe c is read using the value of window.mozpaintcount; the appearance of the test feature is changed (for example, through a change in colour or opacity) to induce a repaint; wait a short period (long enough for a scheduled repaint to occur, for example 100 ms); if the new paint count c' is greater than the original paint count c then the test feature 103 is in view, otherwise it is not in view.

Other variations and modifications will be apparent to the skilled person. Such variations and modifications may involve equivalent and other features which are already known and which may be used instead of, or in addition to, features described herein. Features that are described in the context of separate embodiments may be provided in combination in a single embodiment. Conversely, features which are described in the context of a single embodiment may also be provided separately or in any suitable sub-combination.

It should be noted that the term "comprising" does not exclude other elements or steps, the term "a" or "an" does not exclude a plurality, a single feature may fulfill the functions of several features recited in the claims and reference signs in the claims shall not be construed as limiting the scope of the claims. It should also be noted that the Figures are not necessarily to scale; emphasis instead generally being placed upon illustrating the principles of the present invention.

The invention claimed is:

1. A computer implemented method for determining whether a region within a portion of a web page is in view, comprising:
   providing at least one test feature in the region within the portion of the web page, wherein at least one of a browser rendering the web page or an application communicating with the browser is configured to redraw the test feature using at least a first redraw rate when the test feature is in view and at a rate lower than the first redraw rate when the test feature is not in view;
   rendering the web page;
   monitoring, using code operating in a restricted environment without access to position information of the region with respect to a viewable portion of the web page, a redraw rate of the at least one test feature, monitoring the redraw rate comprising monitoring an event indicating the test feature has been redrawn at a rate lower than the first rate, the redraw rate comprising a rate at which the at least one of the browser or the application redraws the at least one test feature within the window; and
   determining, using the code operating in the restricted environment, from the monitored redraw rate whether the region is in view or not in view, determining whether the region is in view or not in view comprising determining the region is not in view in response to detecting the event indicating the test feature has been redrawn at a rate lower than the first rate.

2. A method according to claim 1, wherein the step of monitoring the redraw rate comprises monitoring events issued when a throttle state relating to processing of the test feature is modified.

3. A method according to claim 1, wherein the restricted environment is an iframe.

4. A method according to claim 1, wherein the step of monitoring the redraw rate comprises monitoring behavior of an application programming interface (API) as it relates to the at least one test feature.

5. A method according to claim 4, wherein the step of monitoring the redraw rate comprises monitoring behavior of either a browser API or a plugin API as it relates to the at least one test feature.

6. A method according to claim 1, wherein the step of monitoring the redraw rate occurs at a client device, and the method further comprises:
   transmitting information relating to the monitored redraw rate from the client device to a server.

7. A method according to claim 1, wherein the at least one test feature is any of:
   an element;
   a document;
   a plugin; or
   an applet.

8. A method according to claim 1, wherein determining whether the region is in view or not in view comprises determining at least one of:
   a proportion of the at least one test feature that is in view;
   a height and a width of the at least one test feature that is in view; whether any part of the at least one test feature is in view; and
   whether all of the at least one test feature is in view.

9. A method according to claim 1, wherein the step of determining whether the region is in view comprises comparing the monitored redraw rate with a plurality of control values.

10. A method according to claim 9, further comprising determining the a plurality of control values using empirical or heuristic methods.

11. A method according to claim 10, wherein at least one of the plurality of control values is determined in dependence on a redraw rate of a control feature.

12. A method according to claim 11, wherein the control feature is not viewable.

13. A method according to claim 12, wherein the a plurality of control values with which the redraw rate is compared are chosen in dependence on a previously determined state of the test feature.

14. A method according to claim 1, further comprising varying the position of the test feature between a position within a test region and a position in which the test feature is not viewable.

15. A method according to claim 1, wherein the at least one test feature is located at an edge of the region.

16. A method according to claim 1, wherein the at least one test feature is transparent, translucent or intentionally obscured by another feature.

17. A method according to claim 1, wherein an advertisement is provided in the region.

18. A method according to claim 17, where the at least one test feature is part of or the whole of an advertisement.

19. A method according to claim 1, wherein the application comprises a browser plugin.

20. A system comprising:
    at least one computing device operably coupled to at least one memory and configured to:
        provide a test feature in a region within a portion of a web page, wherein at least one of a browser rendering the web page or an application communicating with the browser is configured to redraw the test feature using at least a first redraw rate when the test feature is in view and at a rate lower than the first redraw rate when the test feature is not in view;
        render the web page;
        determine, using code operating in a restricted environment without access to position information of the region with respect to a viewable portion of the web page, whether a redraw rate of test feature is less than the first rate by monitoring an event indicating the test feature has been redrawn at a rate lower than the first rate, the redraw rate comprising a rate at which the at least one of the browser or the application redraws the at least one test feature within the window;
        determine, using the code operating in the restricted environment, the region is in view in response to detecting the event is inactive; and
        determine, using the code operating in the restricted environment, the region is not in view in response to detecting the event is active.

21. A computer implemented method for determining whether a region within a portion of a web page is in view, comprising:
    providing at least one test feature in the region within the portion of the web page, wherein at least one of a browser rendering the web page or an application communicating with the browser is configured to redraw the test feature using at least a first redraw rate when the test feature is in view and at a rate lower than the first redraw rate when the test feature is not in view;

rendering the web page;

monitoring, using code operating in a restricted environment without access to position information of the region with respect to a viewable portion of the web page, a redraw rate of the at least one test feature, the redraw rate comprising a rate at which the at least one of the browser or the application redraws the at least one test feature within the window; and determining, using the code operating in the restricted environment, from the monitored redraw rate whether the region is in view or not in view, determining whether the region is in view or not in view comprising comparing the monitored redraw rate with a plurality of control values, wherein at least one of the plurality of control values is determined in dependence on a redraw rate of a control feature.

* * * * *